March 10, 1959 L. R. GRABOWSKI 2,876,990
LIFTING JACK

Filed Dec. 9, 1954 2 Sheets-Sheet 1

INVENTOR
Leonard R. Grabowski
BY
ATTORNEY

March 10, 1959 — L. R. GRABOWSKI — 2,876,990
LIFTING JACK
Filed Dec. 9, 1954 — 2 Sheets-Sheet 2

INVENTOR
Leonard R. Grabowski
BY
C. J. Sibbe
ATTORNEY

United States Patent Office 2,876,990
Patented Mar. 10, 1959

2,876,990

LIFTING JACK

Leonard R. Grabowski, Bay City, Mich., assignor to General Motors Corporation, Detroit, Mich., a corporation of Delaware Application December 9, 1954, Serial No. 474,125

2 Claims. (Cl. 254—98)

This invention relates to lifting jacks and more particularly pertains to an automobile jack of such design that the vehicle may be lifted through engagement with a bumper carried thereby.

The invention represents an improvement over that of U. S. Patent 2,609,178 to Kearful et al. granted September 2, 1952, and aims to still further reduce the effort required to lift the load of the vehicle. A further object is to simplify the manufacture of the jack and to reduce its cost.

Figure 1:
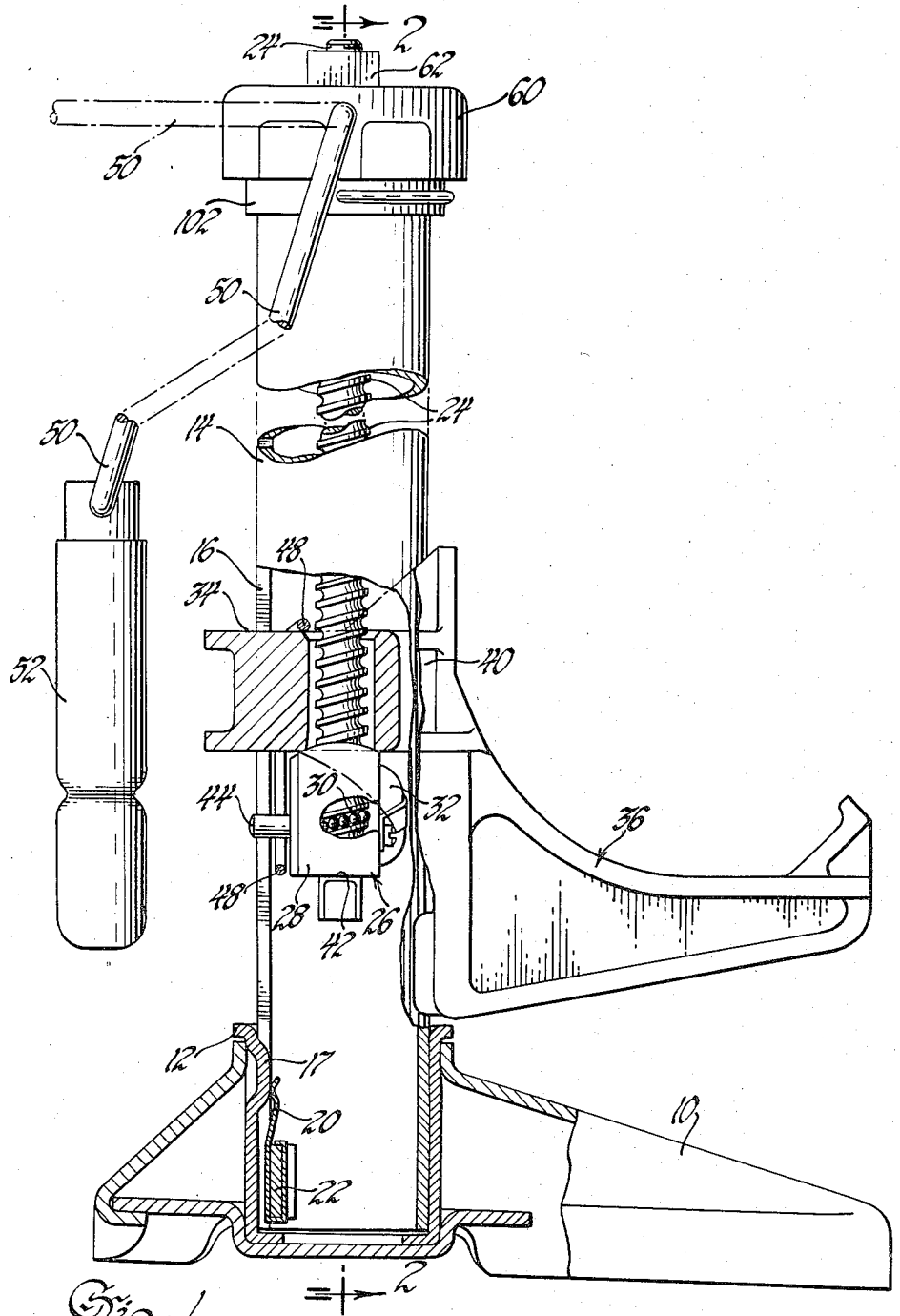
Figure 2:
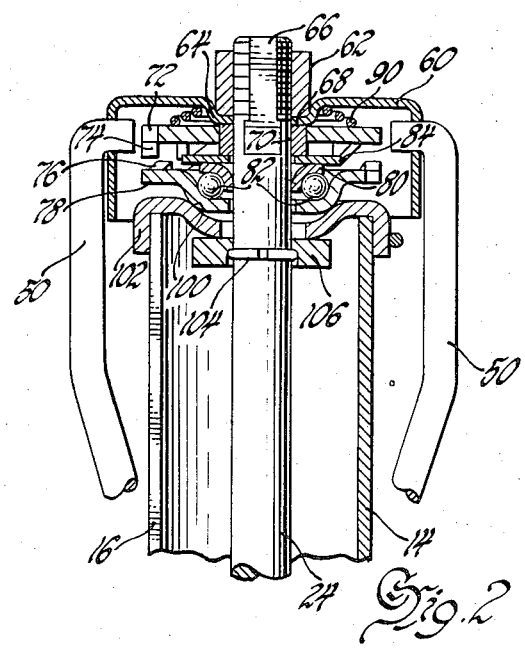
Figure 3:
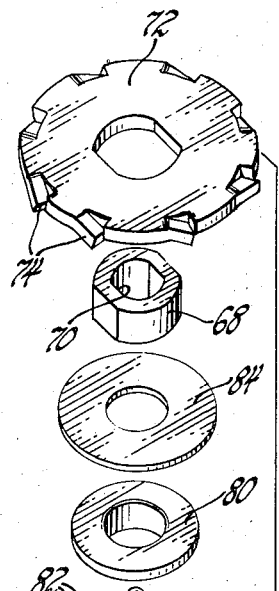
Figure 3:
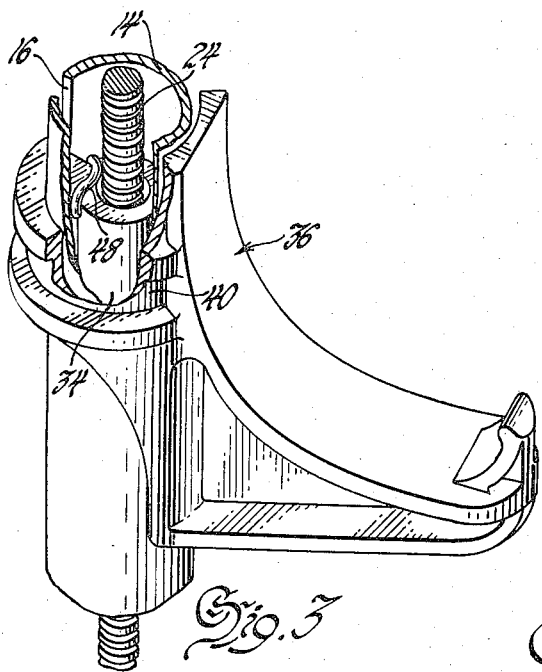
Figure 4:
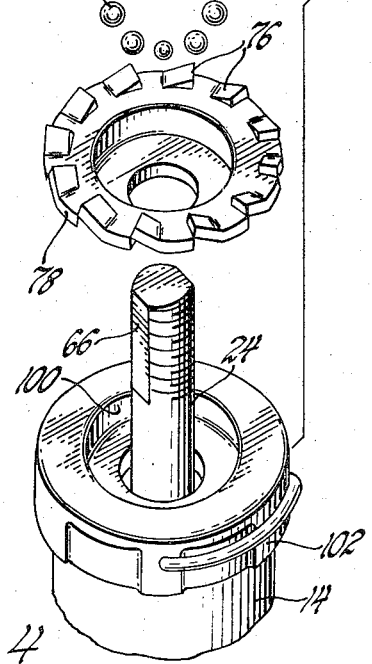

The invention will be specifically described in terms of a preferred embodiment thereof illustrated by the accompanying drawings in which;

Fig. 1 is a partial section;
Fig. 2 is a fragmentary section;
Fig. 3 shows in detail the shoe or hook component through which the vehicle to be lifted is engaged; and
Fig. 4 is a exploded perspective view showing the several parts at the top of the jack.

Referring first to Fig. 1, it will be seen that the construction includes a base 10 in which is fitted a cup piece 12 receiving the lower end of the housing or column 14, which is slotted throughout its length as indicated at 16. Cup 12 is deformed at 17, the deformed portion being received in the longitudinal slot 16. A spring clip 20 bearing on the portion 16 and secured to a tang 22 integral with the column 14 acts to detachably secure the end of the column within the cup 12.

Column 14 confines a screw 24 carrying a ball nut 26, the ball nut being shown in its lower-most position in Fig. 1. Such devices are well understood in the art, and accordingly, the nut need not be described in any detail here. Suffice it to say that the same comprises a body portion 28 provided internally with a helical groove having a pitch set by the pitch of the screw 24, the groove serving to partially accommodate the balls 30 which constitute a continuous train. A transfer tube 32 links the ends of the internal grooves in the casing 28, providing a return course for the balls.

The upper surface of the portion 28 will be seen as rounded in correspondence with a portion of the under surface of a collar 34 integral with a shoe or hook 36 by means of which the vehicle to be lifted is engaged. Collar 34 surrounds the screw 24 within the column 14 and is itself surrounded by a second collar 40 also integral with the shoe 36 and disposed outwardly of the column 14. The collars are interconnected by a portion of the shoe member which extends through the longitudinal slot 16.

The lower end of the nut 26, as shown, seats on a shoulder 42 formed near the lower end of the screw 24. The nut includes a pin 44 which is received in the slot 16 and which serves to prevent rotation of the nut. A carrier hook 48 looping around the pin 44 and the collar 34 prevents free movement of the shoe.

The jack is manipulated by means of a bifurcated lever 50 having a hand grip 52. In operation, the turning of the screw is accomplished by rotating the lever about the axis of the screw. The lever need not be maintained perpendicular to the column.

The lever arms will be seen as received in apertures formed in a hood-shaped cap member 60. The latter is secured to the screw 24 by a square nut 62 which in final tightening is forced into a square recess 64 in the cap member.

Screw 24 is flattened at 66 (Fig. 2) and has disposed therearound at 68 a spacer element having inner walls 70 (Fig. 4) formed in correspondence with the periphery of the screw at such point.

Surrounding the spacer is a brake member 72 having depending ratchet teeth 74 extending into engagement with the ratchet teeth 76 of a lower ball race 78 seating on the column cover plate or disc 102. The upper race 80 for the balls 82 is spaced from the brake member 72 by a washer 84.

The hole in the brake member 72 in which the spacer 68 is received will be noted as formed in correspondence with the outer contour of the spacer so that on rotation of the cap member 60 the brake member necessarily revolves therewith. A coil spring 90 immediately below the cap member exerts a force assuring contact between the ratchet teeth 74, 76. The spring yields to permit the upper ratchet teeth to ride over the lower on rotation of the screw in the direction resulting in elevation of the ball nut and shoe 36. This direction is indicated by the arrow in Fig. 1.

On rotation of the screw in the indicated direction, it should be apparent that the bearing surface is represented by the balls 82 confined between the races 78 and 80.

Because of the high efficiency of the jack, it is necessary to brake the same once the vehicle has been elevated to the desired height. This is accomplished through the ratchet teeth 74, 76 which become engaged on cessation of the effort at the handle 52. With the ball bearing thus locked out, on reverse rotation of the screw to lower the vehicle, the bearing surface is at 100, i. e., the upper surface of the column cover plate 102.

Upward axial movement of the screw incident to the reverse rotation is precluded by a snap ring 104 accommodated in an annular groove formed in the screw and maintained in position by a retainer 106 surrounding the snap ring and adapted to engage the under surface of the cover 102. The disengagement of column 14 and the bearing surface 100, as well as the rotation of bearing surface 100 on column 14, is prevented by a snap ring 107 which engages both pieces thus preventing motion in any direction.

Having thus described and illustrated my invention, what I claim is:

1. In a jack construction or the like including a screw, means on said screw for translating rotary motion thereof into linear motion, said means being operably connected to means for directly engaging the load, column means surrounding said screw and reacting the load, a cover member for said column, an anti-friction bearing above said cover member comprising a pair of races the lower of which seats on said cover member, and a cap member through which said screw is rotated, the improvement which resides in providing the upper surface of said lower race with ratchet teeth and in interposing between said cap member and said upper race a ratchet element turning with said screw and carrying downwardly extending teeth adapted to operably engage the teeth carried by lower race to rotate the same in one direction of rotation of said screw.

2. A jack construction according to claim 1 additionally comprising a spring biasing said ratchet element toward said lower race and reacting against the under surface of said cap member.

References Cited in the file of this patent
UNITED STATES PATENTS

| | | |
|---|---|---|
| 821,617 | Dodds | May 29, 1906 |
| 845,657 | Leroy | Feb. 26, 1907 |
| 2,551,309 | Allison | May 1, 1951 |
| 2,609,178 | Kearful et al. | Sept. 2, 1952 |
| 2,663,542 | Lincoln et al. | Dec. 22, 1953 |